US008735759B2

(12) United States Patent
Potratz et al.

(10) Patent No.: US 8,735,759 B2
(45) Date of Patent: May 27, 2014

(54) FEATURES TO LIMIT THE EXHAUST DEBRIS EXITING A CIRCUIT BREAKER

(75) Inventors: Jason Potratz, North Liberty, IA (US); David R. Pearson, Palo, IA (US)

(73) Assignee: Schneider Electric USA, Inc., Palatine, IL (US)

( * ) Notice: Subject to any disclaimer, the term of this patent is extended or adjusted under 35 U.S.C. 154(b) by 361 days.

(21) Appl. No.: 12/611,399

(22) Filed: Nov. 3, 2009

(65) Prior Publication Data

US 2011/0100958 A1 May 5, 2011

(51) Int. Cl.
*H02B 13/02* (2006.01)
*H01H 33/02* (2006.01)

(52) U.S. Cl.
USPC .............................. 218/155; 218/35; 218/157

(58) Field of Classification Search
CPC ......... H01H 33/18; H01H 33/02; H01H 9/40; H01H 9/44; H01H 9/46; H01H 9/06; H02B 13/00; H02B 13/02; H02B 13/035
USPC ..................... 218/154–157, 146–150, 34–39; 335/201, 202; 200/306
See application file for complete search history.

(56) References Cited

U.S. PATENT DOCUMENTS

| | | | | |
|---|---|---|---|---|
| 3,631,369 | A * | 12/1971 | Menocal | 218/157 |
| 3,773,994 | A | 11/1973 | Beatty | |
| 4,019,005 | A | 4/1977 | Michetti | |
| 5,753,877 | A * | 5/1998 | Hartzel et al. | 218/157 |
| 6,291,788 | B1 | 9/2001 | Doughty et al. | |
| 6,762,389 | B1 | 7/2004 | Crooks et al. | |

* cited by examiner

*Primary Examiner* — Amy Cohen Johnson
*Assistant Examiner* — Marina Fishman
(74) *Attorney, Agent, or Firm* — Locke Lord LLP

(57) ABSTRACT

A debris collection slot or groove formed near the exit of a vent channel in a circuit breaker. Debris is produced during a circuit interruption, causing the debris to travel into the vent channel toward an opening where it exits the circuit breaker. Too much accumulated debris can lead to a ground strike or a cross-phase condition. The debris collection groove, formed near the exit opening of the vent channel, has no significant effect on the internal pressure generated during the circuit interruption. Multiple grooves can be formed near the exit opening for trapping more debris. When the vent channel is bent, the grooves are positioned on the outer curve of the last bend of the vent channel to trap the higher-density debris traveling around the curve.

12 Claims, 3 Drawing Sheets

FEATURES TO LIMIT THE EXHAUST DEBRIS EXITING A CIRCUIT BREAKER

FIELD OF THE INVENTION

The present disclosure relates to circuit breakers, and, more particularly, to a debris collection groove formed in an exhaust vent of a circuit breaker for collecting debris produced during a circuit interruption.

BACKGROUND

Vents relieve pressure in circuit breakers generated by debris and ionized gases produced during a circuit interruption and can be situated near grounded metal that is part of the circuit-breaker enclosure or near a line-side bus, which is at a different voltage than the exiting gas. Debris generated during the circuit interruption can include metal particles that can be made molten by hot ionized gases. When the debris exits the circuit breaker, it can reduce the dielectric strength of the vent path and the through-air and over-surface dielectric spacings to grounded metal or bussing just outside the vent and promote a ground strike or cross-phase. Conventional ways of reducing debris exiting the circuit breaker include covering the vent opening with a screen or a perforated plate. But these obstructions increase the internal pressure generated during the circuit interruption, which can be undesirable.

BRIEF SUMMARY

The present invention avoids significantly increasing the internal pressure inside the circuit breaker while trapping some of the debris that is produced during a circuit interruption. Whereas the conventional thing to do was to add at the exit of the vent channel a screen or a perforated plate, which would catch some of the debris, the present invention proposes to turn that conventional wisdom on its head by doing precisely the opposite—i.e., removing any obstruction at the exit of the vent channel and instead forming a groove or slot near the exit of the vent channel to trap some of the debris in the groove or grooves as the debris is being expelled from the circuit breaker. In vent channels having a serpentine shape with multiple bends, the groove is best formed near the last bend at the opening of the vent channel. Higher-density debris tends to collect toward the outer part of the bend, so placing one or more grooves there will increase the ability of the groove to trap more debris.

BRIEF DESCRIPTION OF THE DRAWINGS

The foregoing and other advantages of the invention will become apparent upon reading the following detailed description and upon reference to the drawings.

Figure 1:
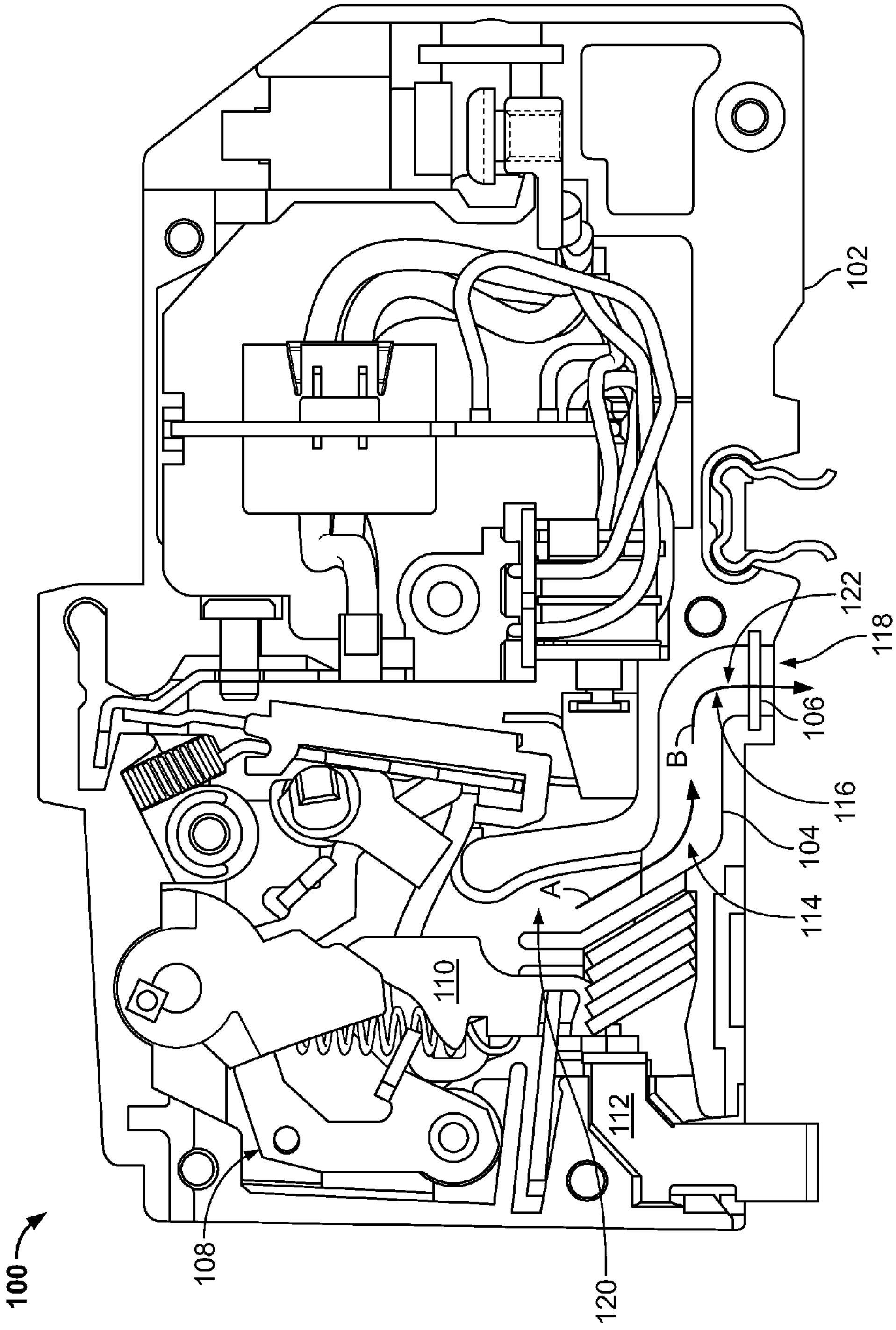
FIG. 1 is a cross-sectional view of a circuit breaker having a grooved vent channel that traps debris produced during a circuit interruption by the circuit breaker.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Figure 2:
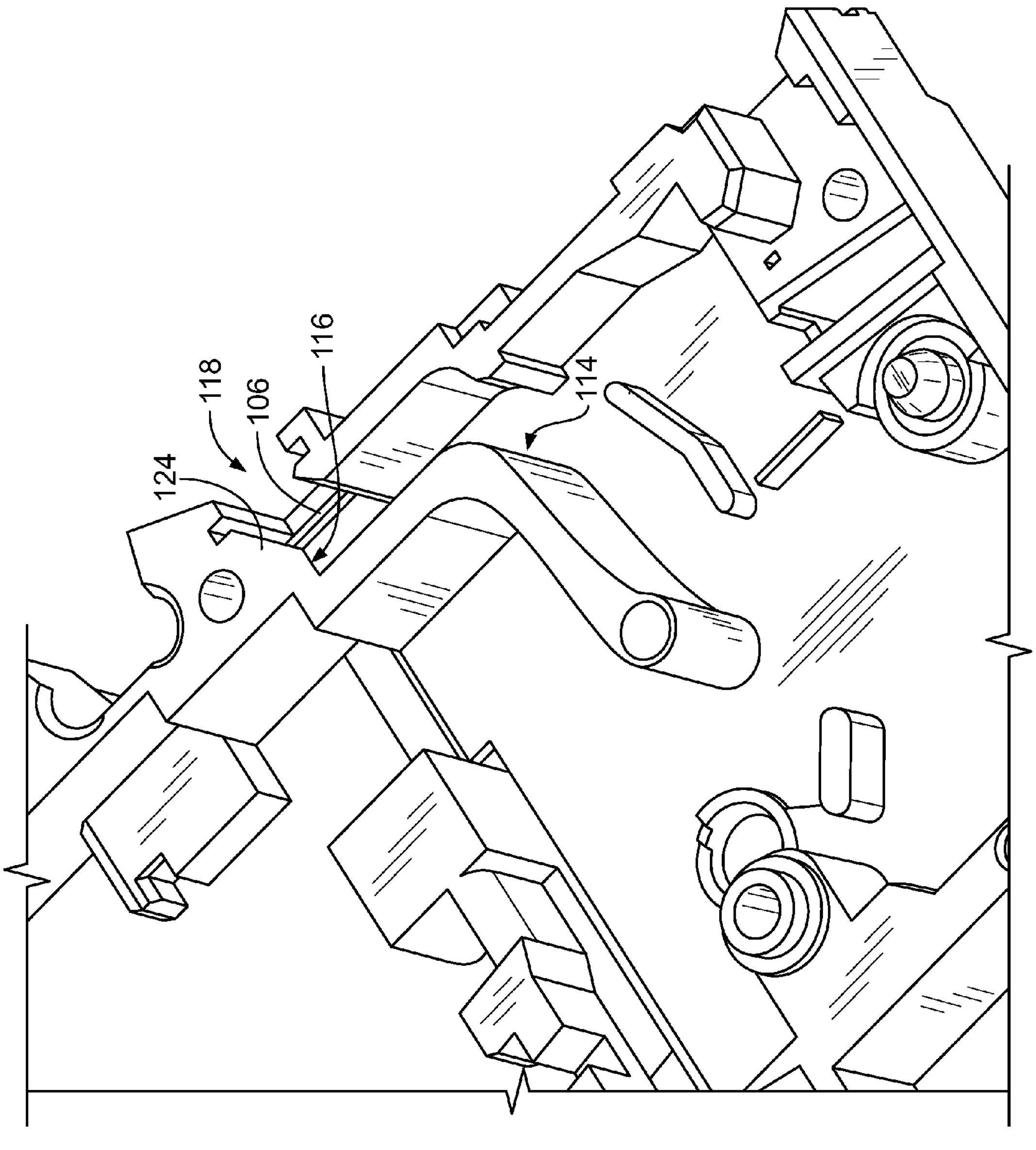
FIG. 2 is a perspective view of a portion of the circuit breaker shown in FIG. 1 with a debris collection groove near the exit of the vent channel.

FIG. 1 is a cross-sectional view of a circuit breaker 100 having a grooved vent channel 104 that traps some of the debris produced during a circuit interruption. FIG. 2 is a perspective view of the vent channel 104 with the cover of the circuit breaker removed. The circuit breaker 100 includes a housing 102, preferably composed of a molded plastic, that houses the various working components of the circuit breaker 100. Conventionally, the circuit breaker 100 includes a trip mechanism 108 that causes a movable contact 110 to separate from a stationary contact 112 in response to detection by the circuit breaker 100 of an electrical fault.

A vent channel 104 is formed in the housing 102 and includes a front pressure area 120 and a back pressure area 122. The front pressure area 120 of the vent channel 104 is positioned proximate the movable contact 110 when it is disengaged from the stationary contact 112. A gas pressure exerted upon the front pressure area 120 is greater than a gas pressure exerted upon the back pressure area 122, which is distal (farther away) from the front pressure area 120 relative to the source of the debris produced when the movable contact 110 separates from the stationary contact 112.

The vent channel 104 has two bends corresponding to a first curved section 114 and a second curved section 116. The back pressure area 122 terminates at an uncovered opening 118 through the housing 102. The vent channel 104 includes a debris collection groove or slot 106 formed in the housing 102 in the back pressure area 122 such that at least some of the debris is collected in the debris collection groove 106 instead of exiting the circuit breaker 100 through the uncovered opening 118. As the debris travels from the front pressure area 120 to the back pressure area 122 and is finally expelled out of the opening 118, it first encounters the first curved section 114 and changes its direction of travel by more than 45 degrees. As it follows the curve around the first curved section 114, it continues toward the back pressure area 122 until it encounters the second curved section 116, which changes the debris' direction of travel again by more than 45 degrees. In FIG. 1, the debris' direction of travel is altered by 90 degrees. The shape of the vent channel 104 approximates an S or a serpentine having two bends. As the debris rounds the last bend nearest the opening 118, some of the debris will collect and accumulate in the debris collection groove 106 instead of exiting the opening 118.

The debris collection groove 106 operates like a screen or perforated plate that has been conventionally installed at the opening 118, but without affecting the internal pressure in the vent channel 104 during interruption of the circuit breaker 100. Because the opening 118 can remain uncovered and free of a screen or perforated plate, incorporating a groove 106 at the opening 118 does not significantly increase the internal pressure as any obstruction placed at the opening 118 would. The effective cross-section of the vent channel 104 is not reduced, and the flow rate of the exiting gases is not reduced because the opening 118 is uncovered and free of any obstruction, such as a screen or perforated plate. By reducing the amount of debris that is expelled from the circuit breaker 100, the potential for a ground strike or cross phase is reduced.

As can be seen from FIG. 2, the groove 104 extends around all three sides of the housing 102, and when the cover (not shown) is placed over the housing, a corresponding groove can be formed in the cover such that the groove 104 extends continuously around all four interior surfaces of the circuit breaker 100, such that debris can become trapped along any of the inner surfaces of the circuit breaker 100 where the groove 104 exists.

Figure 3:
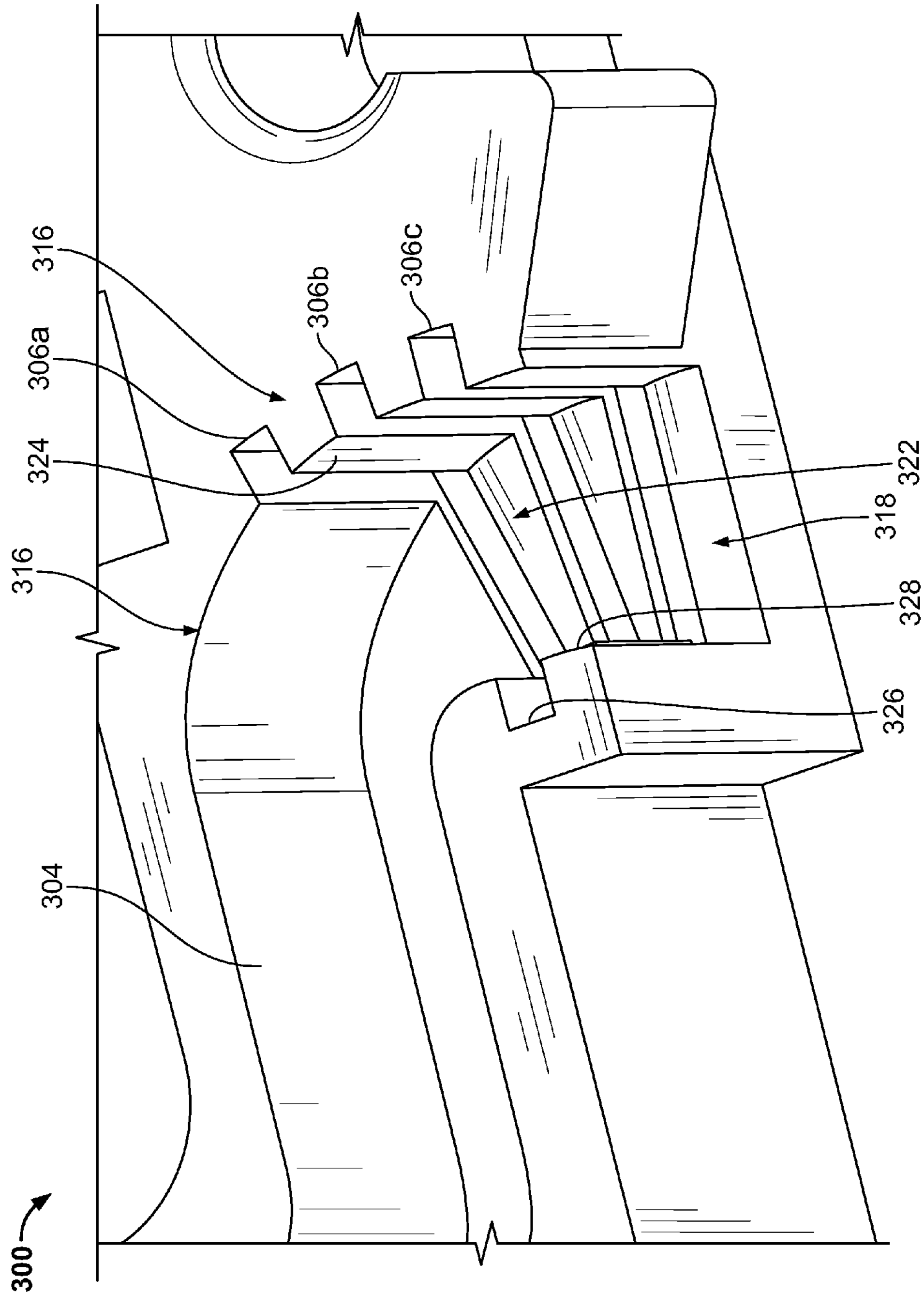
FIG. 3 is a perspective view of a portion of a vent channel having multiple debris collection grooves formed near the last curve of the vent channel before the debris exits the vent channel.

It is advantageous to position the grooves near the last bend of the vent channel, because the higher-density debris tends to travel to the outside of the bend. A groove positioned near the end of that bend would tend to trap the higher-density debris as it rounds the last corner before exiting the circuit breaker. FIG. 3 illustrates a different arrangement of debris collection grooves 306*a,b,c* in a vent channel 304 of a circuit breaker 300, which is like the circuit breaker 100 except that the circuit breaker 300 has three debris collection grooves 306*a, b,c* instead of only one as shown in FIGS. 1 and 2. The same reference numbers are used to refer to the same components, but have been increased by 200 to differentiate them from the reference numbers shown in FIGS. 1 and 2. Three debris collection grooves 306*a,b,c* are formed along an inner wall 324 of the vent channel 304 in a back pressure area 322 of the vent channel 304. They are positioned just after a curved section 316 so that higher-density debris traveling through the vent channel 304 will collect in the grooves 306*a,b,c*. As shown in FIG. 3, it is more likely that debris will collect in the grooves 306*a,b,c* due to the trajectory of the debris as it rounds the curve formed by the curved section 316, so more grooves can be formed along the inner wall 324 versus along a second inner wall 328 opposite the inner wall 324. In the example of FIG. 3, a single groove 326 is formed along the second inner wall 328, and the three grooves 306*a,b,c* merge into the single groove 326 as shown. Like the vent channel 104 in FIG. 1, the vent channel 304 is free of a screen or a perforated plate, which would, if present, undesirably impede the flow rate of debris exiting the opening 318.

Although the grooves shown in the figures are formed as mere indentations or cuts into the housing, more elaborate or differently shaped grooves are contemplated. For example, a groove whose opening transitions into a reservoir, like a flask, can trap more debris in the reservoir area. The groove need not extend across the entire surface of an inner wall of the vent channel. Multiple grooves or slots can be formed along the inner wall of the vent channel in a linear configuration or according to a pattern. An object is that before the debris has a chance to exit the vent channel, the debris has somewhere else to go within the vent channel, but the cross section of the vent channel is not compromised and no obstruction is placed near the exit of the vent channel that would undesirably increase the internal pressure within the circuit breaker. The grooves according to the present invention actually allow the cross section of the vent channel to be increased without causing an undesirable build-up of debris on the grounded metal or bussing external to the circuit breaker.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A circuit breaker, comprising:

a housing;

a trip mechanism positioned in the housing for causing a movable contact to separate from a second contact in response to detection by the circuit breaker of an electrical fault; and a vent channel having an inner wall formed in and integral with the housing and positioned proximate the movable contact to exhaust debris produced as the movable contact separates from the second contact during the electrical fault, the inner wall having a first curved section, the vent channel having a front pressure area proximate the movable contact and a back pressure area terminating at an uncovered opening through the housing, the vent channel having a debris collection groove formed in the housing in the back pressure area of the vent channel such that at least some of the debris is collected in the debris collection groove instead of exiting the circuit breaker, the inner wall having a second curved section connected to the first curved section such that the first and second curved sections form a curved path along which the debris changes directions at least twice along a plane defined by the housing before it exits the uncovered opening, wherein the housing, the debris collection groove, and the inner wall are formed from a one-piece construction, the debris collection groove is a plurality of debris collection grooves formed along the second curved section, and the first curved section corresponds to a first inner wall and the second curved section corresponds to a second inner wall, wherein the plurality of debris collection grooves are formed along the first inner wall of the vent channel and merge into a single groove formed along the second inner wall opposite the first inner wall.

2. The circuit breaker of claim 1, wherein the debris collection groove is formed along the second curved section proximate the uncovered opening such that debris traveling around the second curved section collects in the debris collection groove.

3. The circuit breaker of claim 1, wherein a gas pressure exerted upon the front pressure area is greater than a gas pressure exerted upon the back pressure area, the back pressure area being distal from the front pressure area relative to a source of the debris.

4. The circuit breaker of claim 1, wherein the first curved section causes the debris to change direction by more than 45 degrees.

5. The circuit breaker of claim 1, wherein the debris collection groove extends around an interior surface of the vent channel.

6. The circuit breaker of claim 1, wherein the uncovered opening is free of a screen or a perforated plate.

7. The circuit breaker of claim 1, wherein the housing is made of molded plastic and the vent channel is formed with the housing.

8. The circuit breaker of claim 1, wherein the vent channel has a serpentine shape.

9. The circuit breaker of claim 1, wherein the first curved section and the second curved sections are defined by the inner wall and a second inner wall opposite the inner wall, the second inner wall being formed from the one-piece construction and extending along the plane defined by the housing.

10. A circuit breaker, comprising:

a housing;

a trip mechanism positioned in the housing for causing a movable contact to separate from a second contact in response to detection by the circuit breaker of an electrical fault;

a vent channel having an inner wall formed in and integral with the housing and positioned proximate the movable contact to exhaust debris produced as the movable contact separates from the second contact during the electrical fault, the inner wall having a first curved section connected to a second curved section, the first and second curved sections forming a curved path along which the debris changes directions at least twice along a plane defined by the housing before exiting the circuit breaker, the vent channel having a front pressure area proximate the movable contact and a back pressure area terminating at an uncovered opening through the housing, the vent channel having a plurality of debris collection grooves formed along the second curved section proximate the uncovered opening in the back pressure area of the vent channel such that at least some of the debris traveling around the second curved section collects in the debris collection groove instead of exiting the circuit breaker, wherein the housing, the debris collection grooves, and the inner wall are formed from a one-piece construction.

11. The circuit breaker of claim 10, wherein the vent channel has a serpentine shape.

12. The circuit breaker of claim 10, wherein each of the plurality of debris collection grooves extends around at least three sides of the housing.

* * * * *